(12) United States Patent
Stowe (10) Patent No.: US 12,501,966 B2
(45) Date of Patent: Dec. 23, 2025

(54) CUSTOM 3-D ORTHOTIC DEVICE

(71) Applicant: FootPact, LLC, Rochester, MN (US)

(72) Inventor: Gary Stowe, Rochester, MN (US)

(73) Assignee: FootPact, LLC, Rochester, MN (US)

( * ) Notice: Subject to any disclaimer, the term of this patent is extended or adjusted under 35 U.S.C. 154(b) by 135 days.

(21) Appl. No.: 17/080,728

(22) Filed: Oct. 26, 2020

(65) Prior Publication Data

US 2021/0120910 A1  Apr. 29, 2021

Related U.S. Application Data

(60) Provisional application No. 62/982,043, filed on Feb. 26, 2020, provisional application No. 62/926,031, filed on Oct. 25, 2019.

(51) Int. Cl.
| | |
|---|---|
| *A43B 7/14* | (2022.01) |
| *A43B 7/144* | (2022.01) |
| *A43B 7/1445* | (2022.01) |
| *A43B 7/145* | (2022.01) |
| *A43B 7/1455* | (2022.01) |
| *A43B 7/1485* | (2022.01) |
| *A43B 7/149* | (2022.01) |
| *A43B 7/22* | (2006.01) |
| *A43B 7/28* | (2006.01) |
| *A43B 13/14* | (2006.01) |
| *A61F 5/01* | (2006.01) |
| *A61F 13/06* | (2006.01) |

(52) U.S. Cl.
CPC .............. *A43B 7/223* (2013.01); *A43B 7/144* (2013.01); *A43B 7/1445* (2013.01); *A43B 7/145* (2013.01); *A43B 7/147* (2013.01); *A43B 7/1485* (2013.01); *A43B 7/149* (2013.01); *A43B 7/1495* (2013.01); *A43B 7/226* (2013.01); *A43B 7/28* (2013.01); *A43B 13/148* (2013.01); *A61F 5/0127* (2013.01); *A61F 13/069* (2013.01); *A61F 2005/0172* (2013.01)

(58) Field of Classification Search
CPC ..... A43B 7/147; A43B 7/1485; A43B 7/1495; A43B 7/22; A43B 7/223; A43B 7/226; A43B 7/24; A43B 17/16
See application file for complete search history.

(56) References Cited

U.S. PATENT DOCUMENTS

| | | | | |
|---|---|---|---|---|
| 2,156,086 | A * | 4/1939 | Hack ...................... | A43B 17/16 |
| | | | | 36/76 R |
| 2,163,906 | A * | 6/1939 | Cote ....................... | A43B 7/22 |
| | | | | 36/173 |
| 2,790,254 | A * | 4/1957 | Burns ..................... | A43B 7/22 |
| | | | | 36/178 |

(Continued)

FOREIGN PATENT DOCUMENTS

| | | |
|---|---|---|
| DE | 691399 C | 5/1940 |
| FR | 416629 A | 10/1910 |

(Continued)

*Primary Examiner* — Sharon M Prange
(74) *Attorney, Agent, or Firm* — Mueting Raasch Group (57) ABSTRACT

An orthotic support assembly is disclosed herein that includes an internal device configured to be inserted within a person's footwear. The internal device is formed of a cushioning material and extends from an internal surface at a bottom portion of the footwear to an internal surface of a top portion of the footwear.

18 Claims, 7 Drawing Sheets

(56) References Cited

U.S. PATENT DOCUMENTS

| | | | | |
|---|---|---|---|---|
| 3,726,287 | A | * | 4/1973 | Wikler ............... A61F 5/14 36/176 |
| 3,825,017 | A | * | 7/1974 | Scrima ............... A43B 7/28 36/181 |
| 4,503,576 | A | | 3/1985 | Brown |
| 4,603,698 | A | | 8/1986 | Guttmann Cherniak |
| 4,813,157 | A | | 3/1989 | Boisvert |
| 5,174,052 | A | * | 12/1992 | Schoenhaus ......... A43B 7/144 36/176 |
| 5,197,942 | A | | 3/1993 | Brady |
| 5,329,705 | A | | 7/1994 | Grim et al. |
| 5,935,671 | A | | 8/1999 | Lhuillier |
| 6,286,232 | B1 | | 9/2001 | Snyder et al. |
| 6,481,120 | B1 | | 11/2002 | Xia et al. |
| 8,414,511 | B2 | * | 4/2013 | Bushby ............... A43B 7/145 602/61 |
| 9,226,843 | B2 | | 1/2016 | Jones et al. |
| 10,299,953 | B2 | * | 5/2019 | Bushby ............... A43B 7/1435 |
| 2001/0000369 | A1 | * | 4/2001 | Snyder ............... A43B 13/41 36/173 |
| 2002/0174568 | A1 | | 11/2002 | Neiley |
| 2005/0240139 | A1 | | 10/2005 | Bushby |
| 2006/0101667 | A1 | | 5/2006 | Kane |
| 2007/0033836 | A1 | | 2/2007 | Rasmussen |
| 2008/0040950 | A1 | | 2/2008 | Mariacher |
| 2010/0083534 | A1 | | 4/2010 | Howlett |
| 2011/0197475 | A1 | | 8/2011 | Weidl et al. |
| 2014/0068837 | A1 | | 3/2014 | Roon |
| 2014/0352174 | A1 | | 12/2014 | Benkovic |
| 2017/0251750 | A1 | * | 9/2017 | Devoe ............... A43B 23/22 |
| 2018/0008000 | A1 | * | 1/2018 | Chanda ............... B33Y 80/00 |
| 2019/0246736 | A1 | | 8/2019 | Bushby |
| 2019/0297992 | A1 | * | 10/2019 | Raza ............... A43B 7/147 |
| 2020/0288811 | A1 | | 9/2020 | Purcell |
| 2021/0120908 | A1 | | 4/2021 | Stowe et al. |
| 2021/0121313 | A1 | | 4/2021 | Stowe |

FOREIGN PATENT DOCUMENTS

| | | |
|---|---|---|
| FR | 1351722 A | 2/1964 |
| FR | 2461467 A1 | 2/1981 |
| FR | 2925828 A1 | 7/2009 |
| KR | 20130065343 A | 6/2013 |

\* cited by examiner

CUSTOM 3-D ORTHOTIC DEVICE

BACKGROUND

Orthotic devices are used to support a patient's foot during walking. Current orthotic devices include generally flat inserts that fit into a bottom of a patient's shoe to provide support to the patient. In some instances, flat orthotic devices are supplemented with auxiliary support devices such as ankle foot orthoses. Further orthotic devices include custom orthotic shoes formed to support the patient. These current solutions can be uncomfortable, inflexible, expensive and unforgiving, leading to undesirable outcomes.

SUMMARY

A custom 3-D orthotic device is disclosed herein that is configured to be inserted within a patient's shoe. The orthotic device includes a first portion supporting at least a portion of a sole of the patient's foot and a second portion that extends to a top of a user's foot.

DETAILED DESCRIPTION

Figure 1:
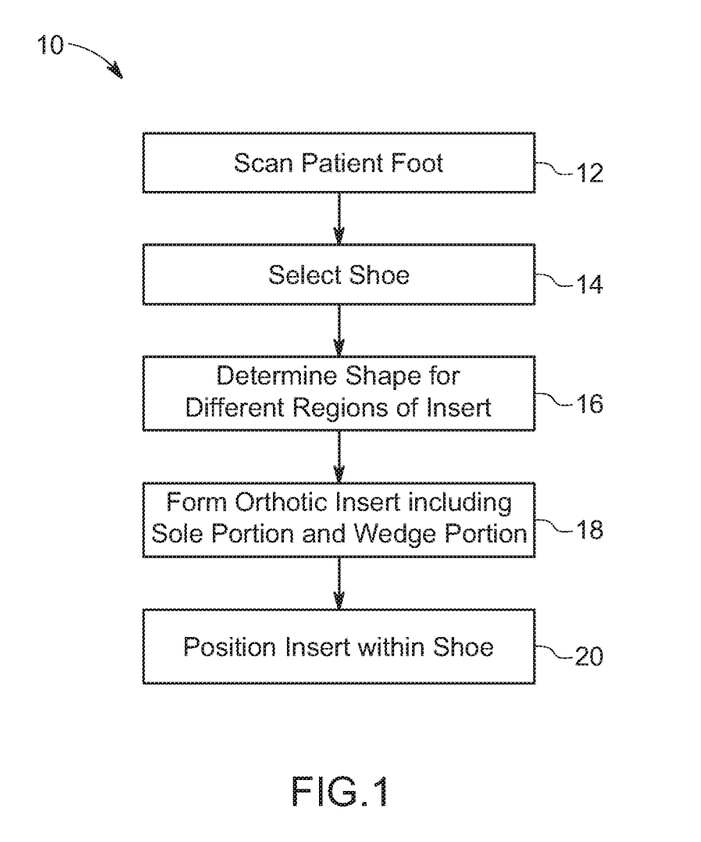
FIG. 1 is flow diagram of a method of forming a custom orthotic device.

FIG. 1 is a flow diagram of a method 10 for forming a custom orthotic insert or device for use with a patient's footwear, for example a conventional shoe or boot. At step 12, a patient's foot is scanned. The scanning can be based on pressure points on a bottom of the patient's foot (e.g., using an impression or pressure activated circuits) and/or optical capture of an overall shape of the patient's foot. In addition, the scanning can include identifying a position of one or more wounds on a patient's foot. At step 14, a shoe for the insert can be selected. The shoe can be any type or style and measured for use with the custom orthotic insert. Based on the scanning in step 12 and selection in step 14, method 10 proceeds to step 16, where a shape for different regions of the insert can be determined. For example, as discussed below, the shape can include a sole portion, a wedge portion, one or more openings and varying thicknesses throughout the orthotic insert. The orthotic insert is then formed at step 18, including the sole portion and wedge portion. Additionally, if needed, one or more openings in the orthotic can also be formed in the insert. Once the insert is complete, the insert can be positioned within the shoe at step 20.

Figure 2:
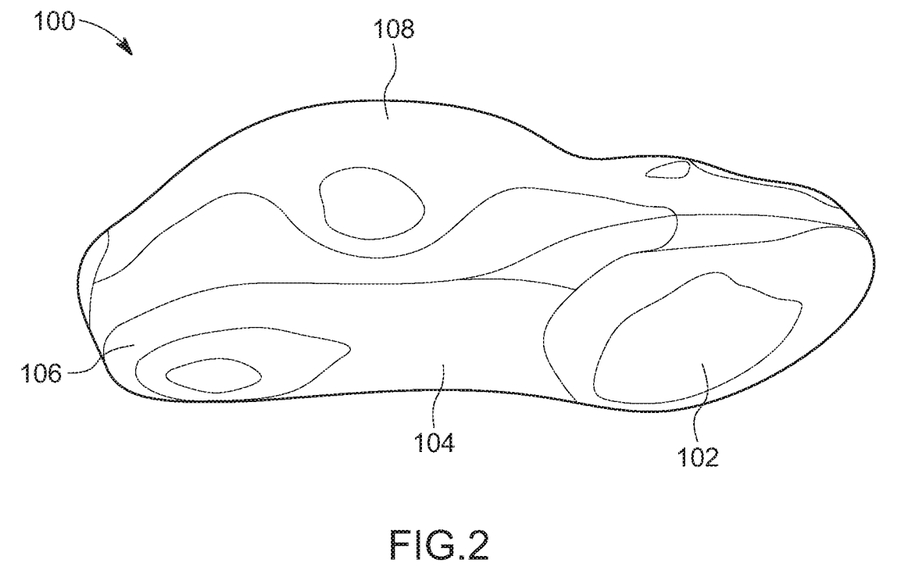
FIG. 2 is a side view of a custom orthotic device.
Figure 3:
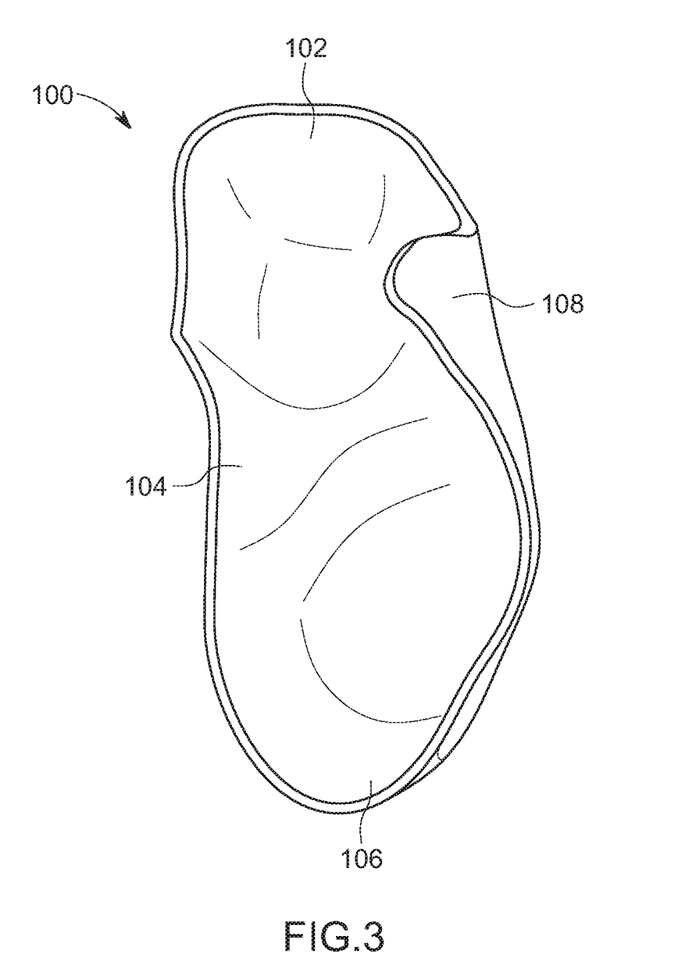
FIG. 3 is a plan view of the custom orthotic device of FIG. 2.
Figure 4:
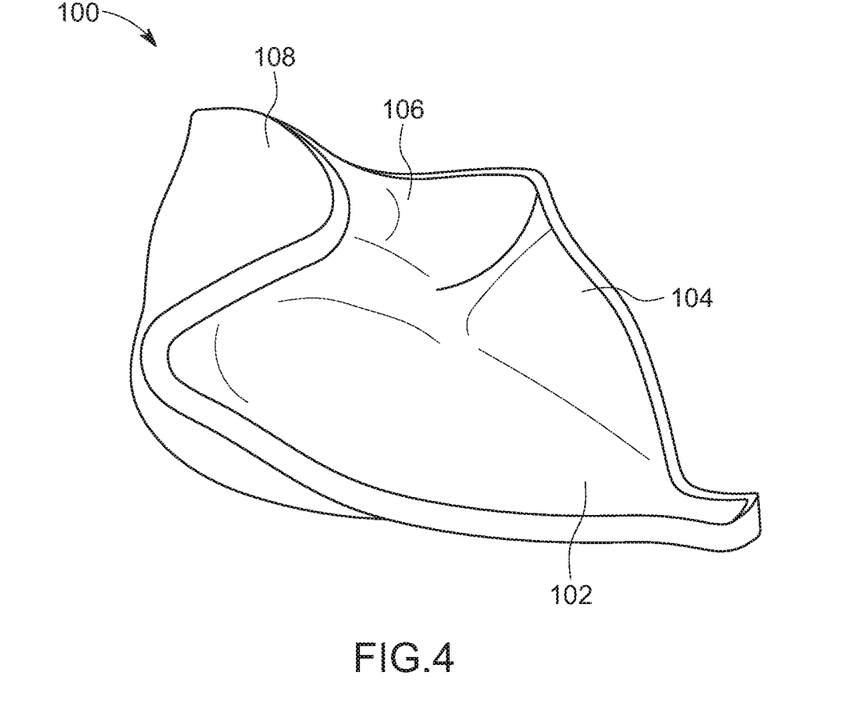
FIG. 4 is an end view of the custom orthotic device of FIG. 2.

FIGS. 2-4 show an example embodiment of an orthotic support insert or device 100 sized to be positioned within an external device such as a shoe, boot or the like that is formed in accordance with method 10 of FIG. 1. The device 100 includes a forefoot portion 102, a midfoot portion 104, a hindfoot portion 106 and a wedge portion 108 extending along a side of the midfoot portion 104. In one embodiment, the device 100 can be formed of a cushioning material (e.g., foam) that removes excess tolerance and is compressed between a user's foot and an inside portion of the shoe. Stated another way, the cushioning material of the device 100 contacts the top, side(s) and bottom of the foot and further contacts a top interior surface, a bottom interior surface and side interior surface(s) of the shoe. The wedge portion 108, in the embodiment illustrated, includes a vertical portion that extends upwardly along a side of the midfoot portion 104. Further, the wedge portion 108 includes a transverse portion that extends away from the vertical portion and terminates at a free end. At least a portion (i.e., the transverse portion) of the wedge portion 108 is positioned on a top of the user's foot during use. In other embodiments, the wedge portion 108 extends at least ½ way up a height of the patient's foot, at least ¾ way up a height of the patient's foot or other heights to provide separation between the patient's foot and the corresponding shoe. To this end, the wedge portion 108 wraps around the patient's foot.

Wedge portion 108 can be positioned and configured in various ways. For example, wedge portion 108 may have a thickness of greater or lesser extent than the forefoot portion 102, midfoot portion 104 and/or hindfoot portion 106. In other embodiments, the wedge portion 108 can be positioned on an inside (medial aspect) of the foot, an outside (lateral aspect) of the foot or in other locations as desired. The wedge portion 108 is configured to establish an interior volume in select portions of the foot between a surface of a patient's skin and an internal surface of the patient's shoe. To this end, the location and extent of the wedge portion 108 can be selected as desired to establish the interior volume. As a result, wounds within the interior volume can have an enhanced opportunity to heal while the patient wears the orthotic device 100 within the shoe as movement between the patient's foot and the shoe is limited.

Figure 5:
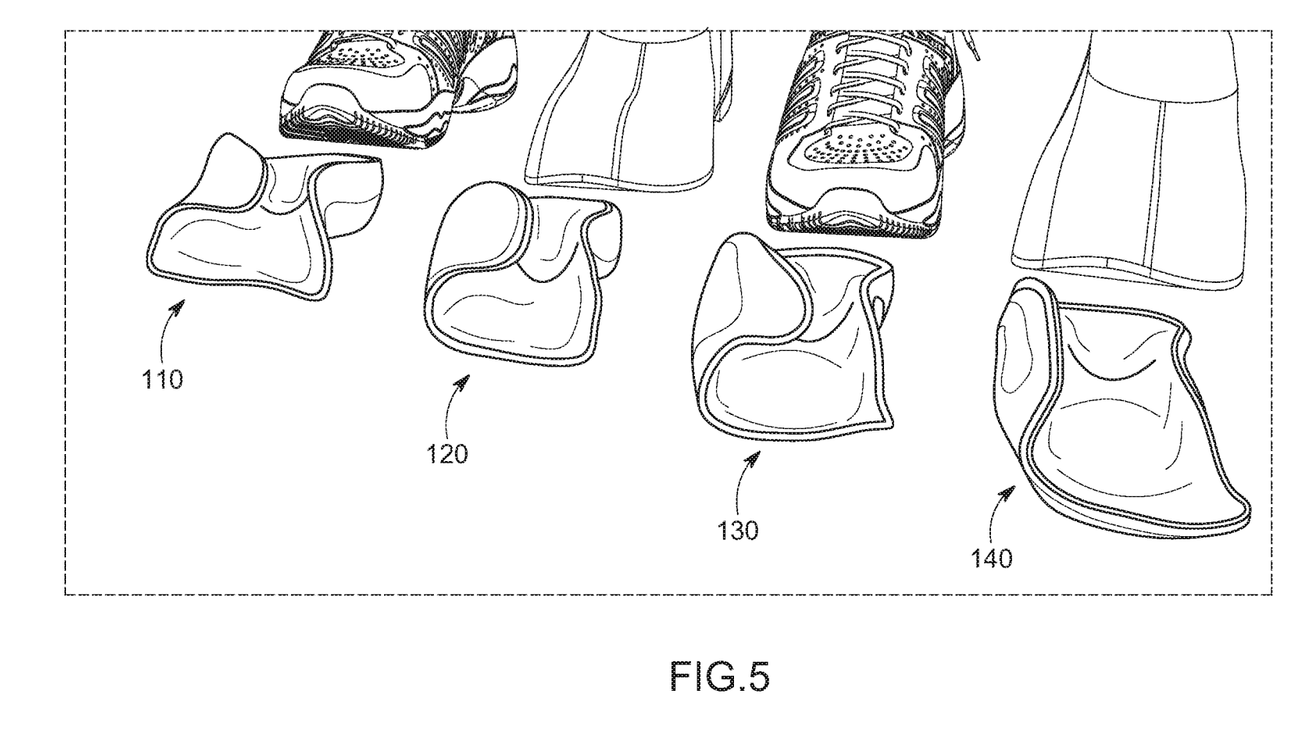
FIG. 5 is a perspective view of custom orthotic devices and corresponding shoes.

FIG. 5 illustrates various orthotic inserts 110, 120, 130 and 140 that can be formed using method 10 of FIG. 1. These inserts 110-140 are formed and associated with a selected shoe, such that a patient can have different inserts for different shoes. The inserts are illustrated with different sized wedge portions, as well as insole portions that extend a height above their respective sole portions. For example, a free end of respective wedge portions for the inserts 110-140 can terminate at different positions on top of the foot as desired.

Figure 6:
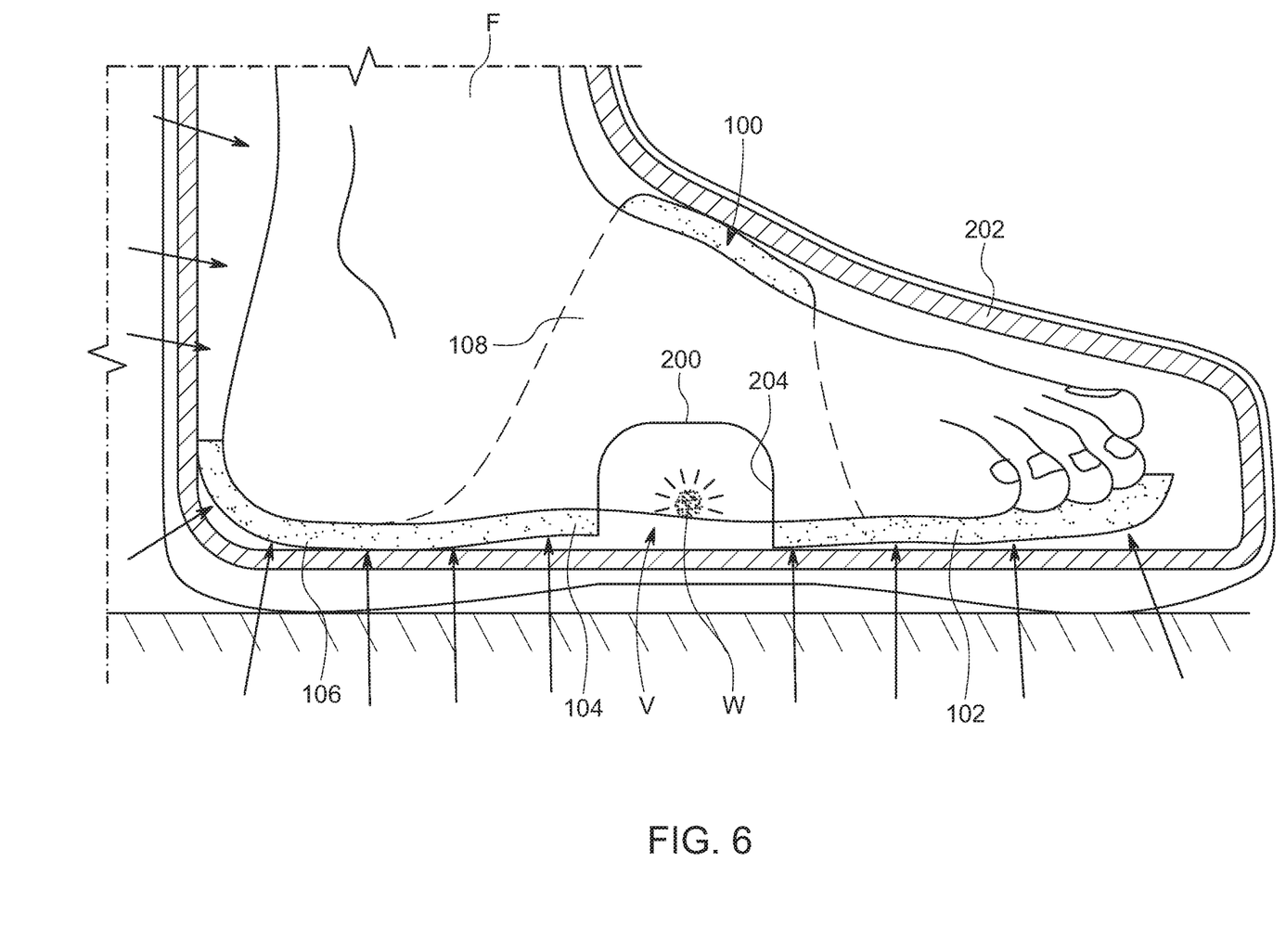
FIG. 6 is a schematic sectional view of a custom orthotic insert supporting a patient's foot within a shoe.
Figure 7:
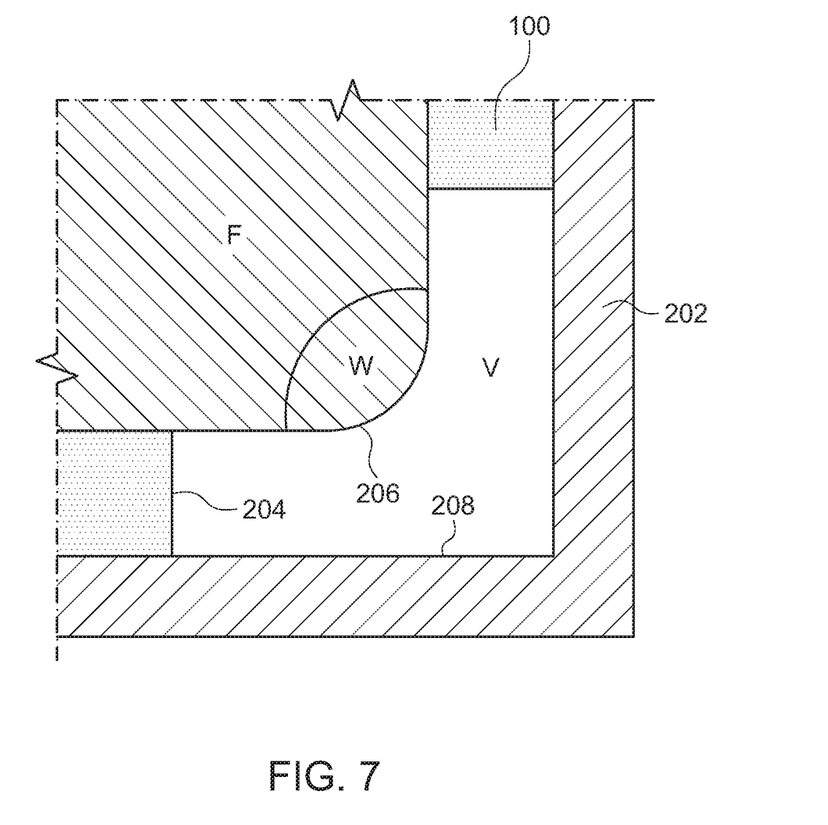
FIG. 7 is a schematic sectional view of a foot within a shoe.

With reference to FIGS. 6 and 7, in one embodiment, the orthotic insert 100 can be formed with an opening 200, which creates an interior volume V within the insert 100, effectively removing excess tolerance between a foot F and a corresponding shoe or boot 202 while suspending the wound W so that the shoe 202 can be utilized conventionally as the wound W heals. The volume V is bound by an edge surface 204 of the opening, a surface 206 of the skin of the foot inbound of the edge surface 204 and a surface 208 of the shoe 202 inbound of the edge surface 204. The interior volume V can be bound by at least one side of the foot F, at least two sides of the foot F, at least three sides of the foot F or all sides of the foot. In the embodiment illustrated, the interior volume V is bound by two sides of the foot F, namely a portion of a sole of the foot F (i.e., the bottom) and a portion of a muscular lateral ridge of the foot F (i.e., the outer side). In other embodiments, the volume V can include the bottom, the bottom and the inner side, the inner side and the top side, the outer side and the top side, the bottom, inner and outer sides, the top, inner and outer sides, or all sides. In further embodiments, multiple openings can be positioned within the insert 100.

Due to the presence of volume V, wound W is suspended within the insert 100 and protected from contact with shoe 202 during use of the insert 100 while a patient walks, stands or engages in other activity. A thickness of the insert 100 can be selected to ensure that ample space exists between the outer surface of the skin and the internal surface of shoe 202. In one embodiment, the thickness of the insert 100 is at least ⅛ inch, at least ¼ inch, at least ⅓ inch, at least ⅜ inch, at least ½ inch, at least ⅝ inch, at least ¾ inch, greater than ¾ inch, between ⅛ and 1 inch and other thicknesses. In addition, a size of the opening (as defined by the edge surface 204) can be selected to provide ample space surrounding the wound W. As a result, forces placed on the foot F during walking, standing or other activity are distributed throughout the insert 100, while the wound W is exposed to little or no forces.

In the illustrated embodiment, opening 200 is positioned in the wedge portion 108 and positioned to surround a wound on an outer side of the patient's foot. The opening 200 is defined by the edge surface 204, which extends along a thickness of the insert 100. As a result, the wound W is suspended within the internal volume V. Forces on the shoe 202 are distributed about the insert 100 and away from the wound W. The wedge portion 108 contacts both a top interior surface of the shoe 200 and a side interior surface of the shoe 200. The forefoot portion 102, midfoot portion 104 and hindfoot portion 106 contact a bottom interior surface of the shoe 200.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A method of providing a custom 3-D orthotic insert, the method comprising:
   determining a shape of a foot of a patient;
   forming an orthotic insert configured to be inserted into a footwear of the patient based on the determined shape of the foot of the patient, the orthotic insert comprising:
      a sole portion,
      a wedge portion extending from the sole portion, wherein the wedge portion comprises a vertical portion and a transverse portion prior to being positioned within the patient's footwear, the transverse portion extending away from the vertical portion and being configured to be positioned over a top portion of the foot of the patient; and
      an opening that defines a volume positioned at an intersection of the sole portion and the wedge portion and configured to suspend a wound on the patient's foot within the volume of the opening;
   wherein forming the orthotic insert comprises forming the orthotic insert that is configured to remove excess tolerance between the patient's foot and an internal surface of the patient's footwear.

2. The method of claim 1, wherein the opening extends through both the sole portion and the wedge portion at the intersection.

3. The method of claim 1, wherein the sole portion comprises a forefoot portion, a midfoot portion, and a hindfoot portion, and the wedge portion extends from a side of the midfoot portion.

4. The method of claim 3, wherein forming the orthotic insert comprises forming the orthotic insert with the wedge portion having a thickness greater than a thickness of the midfoot portion.

5. The method of claim 3, wherein the wedge portion extends from a medial side of the midfoot portion.

6. The method of claim 3, wherein the wedge portion extends from a lateral side of the midfoot portion.

7. The method of claim 1, wherein determining the shape of the foot of the patient comprises making an optical scan of the foot of the patient.

8. The method of claim 1, wherein determining the shape of the foot of the patient comprises determining pressure points on a bottom of the foot of the patient.

9. The method of claim 1, wherein forming the orthotic insert comprises forming the orthotic insert having a thickness of at least ⅛ inch.

10. A custom 3-D orthotic insert comprising:
    a sole portion; and
    a wedge portion extending from the sole portion, the wedge portion comprising a vertical portion and a transverse portion prior to being positioned within the patient's footwear, the transverse portion extending away from the vertical portion and being configured to be positioned over a top portion of a patient's foot; and
    an opening at an intersection of the sole portion and the wedge portion, the opening defining a volume positioned to suspend a wound on the patient's foot within the volume of the opening;
    wherein the sole portion and the wedge portion are custom sized based on a determined shape of the patient's foot and configured to remove excess tolerance between the patient's foot and an internal surface of the patient's footwear.

11. The insert of claim 10, wherein the opening extends through both the sole portion and the wedge portion at the intersection.

12. The insert of claim 10, wherein the sole portion comprises a forefoot portion, a midfoot portion, and a hindfoot portion, and the wedge portion extends from a side of the midfoot portion.

13. The insert of claim 12, wherein the wedge portion has a thickness greater than a thickness of the midfoot portion.

14. The insert of claim 12, wherein the wedge portion extends from a medial side of the midfoot portion.

15. The insert of claim 12, wherein the wedge portion extends from a lateral side of the midfoot portion.

16. The insert of claim 10, wherein the sole portion and the wedge portion have a thickness of at least ⅛ inch.

17. The insert of claim 10, wherein the sole portion and the wedge portion are formed of a cushioning material.

18. The insert of claim 17, wherein the cushioning material is foam.

* * * * *